United States Patent [19]
Jadrich et al.

[11] Patent Number: 5,410,338
[45] Date of Patent: Apr. 25, 1995

[54] METHOD AND APPARATUS FOR MOVING AN OBJECT WITH UNIFORM MOTION

[75] Inventors: Bradley S. Jadrich, Rochester; David K. McCauley, Henrietta, both of N.Y.

[73] Assignee: Eastman Kodak Company, Rochester, N.Y.

[21] Appl. No.: 175,169

[22] Filed: Dec. 29, 1993

Related U.S. Application Data

[63] Continuation of Ser. No. 722,789, Jun. 28, 1991, abandoned.

[51] Int. Cl.6 .......................................... B41J 2/435
[52] U.S. Cl. ................................................ 347/264
[58] Field of Search .................. 346/1.1, 107 R, 76 L, 346/108, 160

[56] References Cited

U.S. PATENT DOCUMENTS 3,573,849  4/1971  Herriot et al. ...................... 346/108
4,285,012  8/1981  Ohara et al. ....................... 346/108
4,631,551  12/1986  Vergona ............................. 346/108
4,757,327  7/1988  Henzi ............................... 346/107 R
4,975,714  12/1990  Rose ................................. 346/108

OTHER PUBLICATIONS

Optical Calibration Improves Ball Screw Accuracy by Richard Korinek *Machine Design*, Apr. 6, 1989, pp. 177-179.

Primary Examiner—Mark J. Reinhart
Attorney, Agent, or Firm—Milton S. Sales

[57] ABSTRACT

A method and apparatus is disclosed for adapting a low precision lead screw to perform in a high precision application by compensating for cyclical positioning errors that are produced by the lead screw. A stage assembly driven by a stepper motor is individually characterized and its inherent cyclical positioning error is stored in a memory device. The memory device is used to control a driving circuit that controls an operation of the stepper motor. The stepper motor is driven in a non-uniform manner that is complementary to a pattern of cyclical positioning errors in the stage assembly. As a consequence, a stage, driven by the lead screw, moves in a uniform manner. The system is disclosed in the context of a printer in which a receiver is driven at a uniform rate by an inexpensive low precision lead screw.

26 Claims, 10 Drawing Sheets

METHOD AND APPARATUS FOR MOVING AN OBJECT WITH UNIFORM MOTION

CROSS REFERENCE TO RELATED PATENT APPLICATIONS

This is a Continuation of application Ser. No. 722,789, filed 28 Jun. 1991, now abandoned.

The present invention is related to two U.S. Patent Applications. The first related application, Ser. No. 457,593 (S. Sarraf, filed Dec. 27, 1990) is entitled "Thermal Printer" and has a common assignee with the present patent application. The second related application, Ser. No. 723,290, (J. S. Chandler et al., filed Jun. 28, 1991), is entitled "Beam Scanning Galvanometer with Spring Supported Mirror" and has a common assignee with the present patent application.

FIELD OF THE INVENTION

The present invention relates to a method and apparatus for producing a uniform motion of an object, and in particular to producing a uniform motion of a receiver in a printing operation.

BACKGROUND OF THE INVENTION

Many cases arise in which there is a need to move an object at a controlled rate. One example is the case of printing high resolution images with a thermal printer. In some applications of thermal printers, a receiver (i.e., printing media) of an image is moved either continuously or in a series of steps as an image is formed on the receiver. In one type of thermal printer a modulated laser beam is focused and scanned across the receiver and an overlying patch of dye-donor film. The receiver is moved an incremental distance between each scan of the laser as an image is produced on a line-by-line basis. A thermal printer of this type is disclosed in a U.S. patent application Ser. No. 457,593 (S. Sarraf, filed Dec. 27, 1990) described in the Cross Reference to Related Patent Applications section hereinabove.

In another type of printer, a receiver is moved continuously while a modulated laser beam is scanned back and forth in a direction that is substantially, but not quite, orthogonal to the direction of movement of the receiver.

In both of these types of printers the receiver is placed on a stage which is driven by a rotating lead screw. In order to produce a high resolution image (i.e., 2000 dots per inch or higher) without visible distortions, it has heretofore been necessary to use a very high precision lead screw in these applications. High precision lead screws are produced by a process of grinding and lapping. These processes produce a lead screw which has a very low cumulative error and a very low cyclic error. A lead screw with a low cumulative error has a highly predictable relationship between displacement along its length and number of revolutions of the screw. A cyclic error is one which appears repetitively in each revolution of the lead screw. A lead screw with a low cyclic error has a highly predictable relationship between displacement along its length and any portion of any one revolution of the screw.

High precision lead screws made by grinding and lapping are much more expensive than conventional lead screws which are produced in a thread rolling or cutting operation on a lathe. In the prior art, inexpensive conventional lead screws have been adapted for use in applications that require low cumulative error. This adaptation has been achieved by a process of developing a characterization of the lead screw and using the characterization to control a drive system in which the lead screw is employed to achieve a predictable relationship between displacement and number of revolutions of the conventional lead screw. This characterization process is performed by a manufacturer of the lead screw prior to sale of the lead screw. The lead screw is placed into a measurement apparatus which uses a laser interferometer to measure and record a relationship of displacement of a target (which is driven by the screw) and a number of revolutions of the screw. These measurements are made at a plurality of locations along the screw and the results are recorded in a memory device such as an EPROM (Electronically Programmable Read Only Memory). The EPROM is then shipped by the lead screw manufacturer, along with the lead screw. A user of the lead screw puts the EPROM into a controller of a drive system into which the lead screw is assembled. The controller drives the lead screw so that specific compensations are made for the cumulative errors of that particular screw.

However, adapting a conventional lead screw to operate without cumulative error does not make the lead screw useful for high resolution printing applications. In a high resolution printing application, it is necessary to use a lead screw which has a low cyclic error rate. The above described characterization process does not reduce cyclic errors in a conventional lead screw. Thus, high resolution printers have heretofore continued to use expensive high precision lead screws.

The high cost of a precision lead screw is a relatively unimportant factor in a printer which is designed for a high volume and high production application. Such large volume printers typically cost hundreds of thousands of dollars. In this context, a precision lead screw which costs between $500 and $1000 dollars is a readily affordable component.

However, there are many types of printers which are intended for use in desk top situations. These printers are typically designed to be used in conjunction with a personal computer to produce images generated by various types of graphics software in the computer. These desk top printers are usually sold for prices less than about $5000. In this context, a high precision lead screw that costs $500 to $1000, is a component with a prohibitively high cost.

Consequently, desk top printers have heretofore been limited to relatively low resolution application (300 dots per inch or less).

It is desirable to have a thermal printer with a low cost lead screw that is capable of producing high resolution images.

SUMMARY OF THE INVENTION

The present invention is directed to a low precision lead screw which is adapted to perform in a high precision application by compensating for cyclical positioning errors that are produced by the lead screw. A stage assembly driven by a lead screw and stepper motor is individually characterized and its inherent cyclical positioning error is stored in a memory device. The memory device is used to control a driving circuit that controls an operation of the stepper motor. The stepper motor is driven in a non-uniform manner that is complementary to a pattern of cyclical positioning errors in the stage assembly. As a consequence, the stage moves in a uniform manner.

Viewed from one aspect, the present invention is directed to an apparatus for moving an object with a uniform motion. The apparatus comprises a lead screw adapted to move the object, a stepper motor adapted to rotate the lead screw in a series of rotational steps, each step being smaller than a complete revolution of the lead screw. The lead screw has, for each revolution, a predetermined pattern of relationships between an amount of displacement of the object and each step of the stepper motor. Means are provided for driving the stepper motor with a pattern of steps that varies as a function of rotational position of the lead screw in accordance with a complement of the predetermined pattern such that the displacement of the object occurs uniformly.

Viewed from another aspect, the present invention is directed to an apparatus for printing an image on an object. The apparatus comprises a lead screw adapted to move the object and a stepper motor adapted to rotate the lead screw in a series of rotational steps, each step being smaller than a complete revolution of the lead screw. The lead screw has, for each revolution, a predetermined pattern of relationships between an amount of displacement of the object and each step of the stepper motor. Means are provided for driving the stepper motor with a pattern of steps that varies as a function of rotational position of the lead screw in accordance with a complement of the predetermined pattern such that the displacement of the object occurs uniformly.

Viewed from still another aspect, the present invention is directed to a method for moving an object with a uniform motion. A lead screw is adapted to move the object. A stepper motor is adapted to rotate the lead screw in a series of rotational steps, each step being smaller than a complete revolution of the lead screw. The lead screw has, for each revolution, a predetermined pattern of relationships between an amount of displacement of the object and each step of the stepper motor. The stepper motor is driven with a pattern of steps that varies as a function of rotational position of the lead screw in accordance with a complement of the predetermined pattern such that, for each revolution of the lead screw, the displacement of the object occurs uniformly.

Viewed from yet another aspect, the present invention is directed to a method for printing an image on an object. A lead screw is adapted to move the object. A stepper motor is adapted to rotate the lead screw in a series of rotational steps, each step being smaller than a complete revolution of the lead screw. The lead screw has, for each revolution, a predetermined pattern of relationships between an amount of displacement of the object and each step of the stepper motor. The stepper motor is driven with a pattern of steps that varies as a function of rotational position of the lead screw in accordance with a complement of the predetermined pattern such that the displacement of the object occurs uniformly.

The invention will be better understood from the following detailed description taken in consideration with the accompanying drawings and claims.

The drawings are not necessarily to scale.

DETAILED DESCRIPTION

Figure 1:
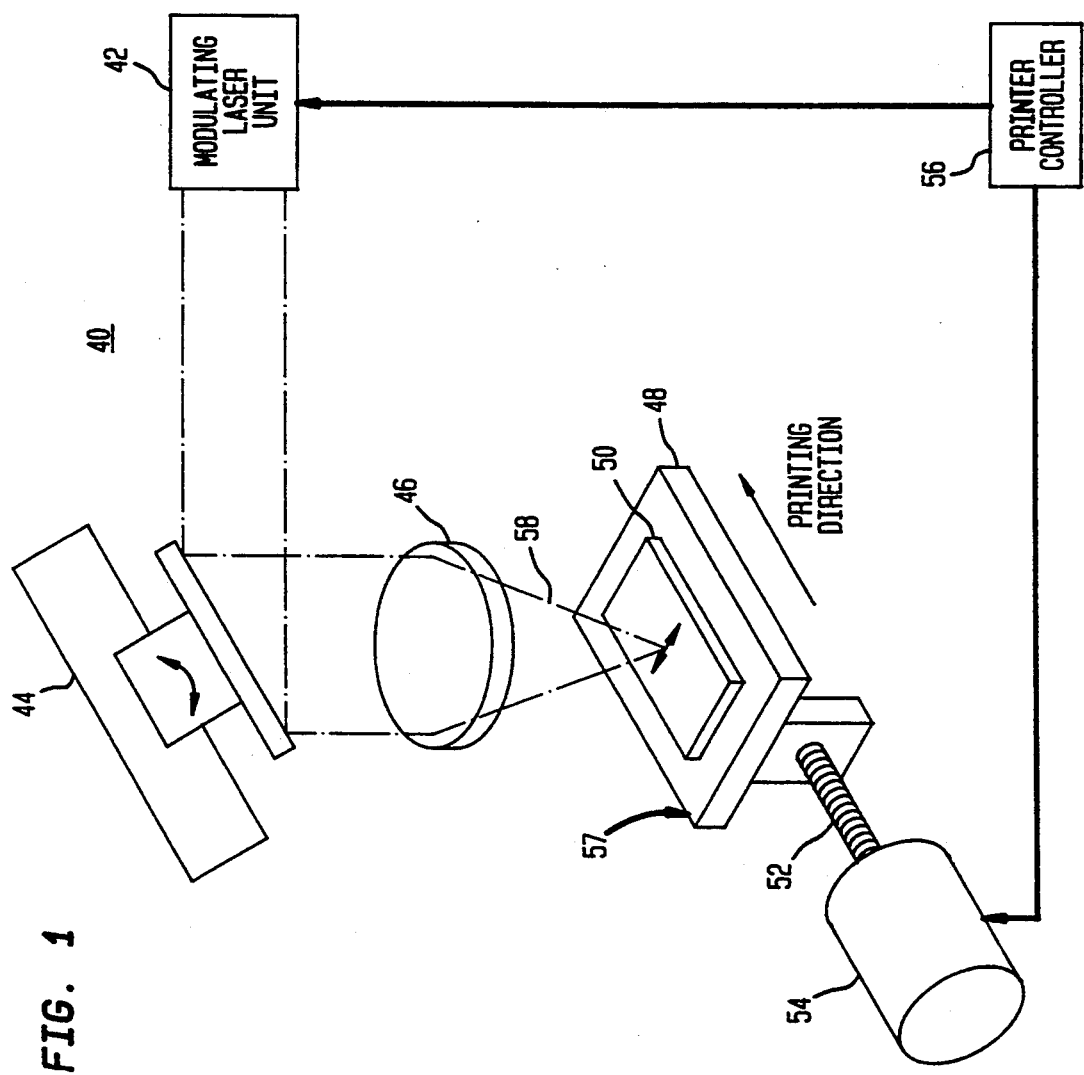
FIG. 1 is schematic illustration of a printing apparatus which is in accordance with one embodiment of the present invention.

Referring now to FIG. 1, there is shown a schematic view of a printer 40 which is in accordance with one embodiment of the present invention. The printer 40 comprises a modulating laser unit 42, a beam scanning galvanometer 44, a scanning lens 46, a stage 48, a lead screw 52, a stepper motor 54 and a printer controller 56. The stage 48 supports and moves a receiver 50 onto which an image is to be formed. The stage 48 is driven by the lead screw 52 which is rotated by the stepper motor 54. A combination of the stage 48, the lead screw 52 and the stepper motor 54 is referred to herein as a stage assembly 57. The printer controller 56 is a microprocessor based control unit with first and second outputs coupled to the modulating laser unit 42 and the stepper motor 54, respectively. In a preferred embodiment of the printer 40, the lead screw 52 is a conventional lead screw model KHD 6002 available from Kerk Motion Products, Inc. The stepper motor 54 is a model Compumotor AX 57-51 Stepper Motor available from Parker-Hannifin, Inc. The stepper motor 54 is driven by a microstepping motor drive circuit (not shown), available from Parker-Hannifin, which is incorporated in the printer controller 56. The microstepping drive circuit produces operating pulses that permit the stepper motor 54 to be operated at a resolution of 25,000 steps per revolution.

In one mode of operation, an image is formed on the receiver 50 in a series of lines with the stage 48 making incremental steps for each line. As each line is reached, the stage 48 is stopped and a focused and modulated beam 58 of laser-produced light is scanned across the receiver 50 by the beam scanning galvanometer 44. A dye-donor film (not shown for purposes of clarity) overlies the receiver 50. The beam 58 causes a sublimation of some of the dye on the dye-donor film and the dye is transferred to the receiver 50. An example of a printer in which the present invention is useful is disclosed and claimed in U.S. patent application Ser. No. 457,593, which is described in the Related Patent Applications section hereinabove and is incorporated herein.

In another mode of operation of the printer 40, the stage 48 is advanced at a uniform speed as the beam 58 is scanned back and forth across the receiver 50. The beam is scanned at an angle that is not exactly orthogonal to the direction of movement of the receiver 50. The uniform speed of the stage 48 and the slightly non-orthogonal scanning produce uniformly spaced lines of printing.

The printer 40 is used to produce computer generated images as transparencies or slides in a 35 mm. format, i.e., approximately 1 inch by 1.5 inch. The slides are used to generate light projected images on a screen which are, in some cases, hundreds of times larger than the slide. Consequently, the image formed on the slide must be at an almost photographic quality, i.e., a resolution of 4000 pixels or dots per inch.

In order to produce images on the receiver 50 with the desired resolution of 4000 dots per inch, it is necessary to maintain very precise control of the speed of the scanned beam 58 across the receiver 50. The control of speed of the beam 58 is achieved by controlling the operation of the beam scanning galvanometer 44. The galvanometer is disclosed and claimed in a U.S. Patent Application entitled "Beam Scanning Galvanometer with Spring Supported Mirror" which is described in the Related Patent Applications section hereinabove and is incorporated herein.

In order to produce high resolution images without distortions, it is necessary that the stage 48 is moved at a uniform speed or in incremental steps which are uniform. If a spacing between one line of printing and the next is substantially different in length, a visually discernible discontinuity or artifact may develop in the image. If a series of spacings vary in length from one another only slightly but in a cyclical pattern, the image may develop a distortion known as banding (i.e., a series of visually discernible bands of varying image intensity appear). The visibility of these anomalies is a function of viewing conditions and image content.

It has been observed in prior art printers, that each of these types of visible distortions occurs in a high resolution image when a stage is driven by a lead screw that is not a high precision lead screw (i.e., a lead screw which is ground and lapped). Additionally it has been found that even a high precision lead screw permits these distortions to develop in a high resolution image if the lead screw is not coupled precisely to a center of an axis of rotation of a stepper motor that drives the lead screw.

Because threads of the conventional lead screw 52 are typically not perfect spirals, and because the lead screw 52 is typically coupled to the stepper motor 54 with a small but finite eccentricity, the lead screw 52 produces a slightly different amount of displacement of the stage 48 at various points of a single revolution of the lead screw 52. For example, a first 30% of a revolution of the lead screw 52 may produce a displacement of the stage 48 of 0.00215 inches. A next 30% of a revolution of the lead screw 52 may produce a displacement of the stage 48 of 0.00218 inches, and the final 40% of the revolution may produce a displacement of 0.00217 inches.

In the printer 40, the lead screw 52 has a thread pitch which produces a nominal displacement of 0.025 inches per revolution. In the context of an image resolution of 4000 dots per inch, one revolution of the lead screw 52 corresponds nominally to 100 lines of the image or 100 steps of the stage. It can be seen therefore that each step of the stage 48 is produced by only 1% of a revolution of the lead screw 52. Consequently, if the lead screw 52 is driven at a uniform rate, it produces a varying displacement for each portion of one of its revolutions. This results in a varying displacement between successive lines of printing on the receiver 50.

In a typical conventional lead screw and stepper motor combination, the variations of displacement within each revolution are cyclical. In other words, a first 30% of a first revolution produces a displacement that is about the same as the first 30% of a second and third revolution of the lead screw 52. Similarly, a second 30% of the first revolution produces about the same displacement as the second 30% of the second and third revolution and so on. These cyclical variations in displacement, if left uncorrected, manifest themselves as cyclical variations in image density on the receiver 50, i.e., banding.

Figure 2:
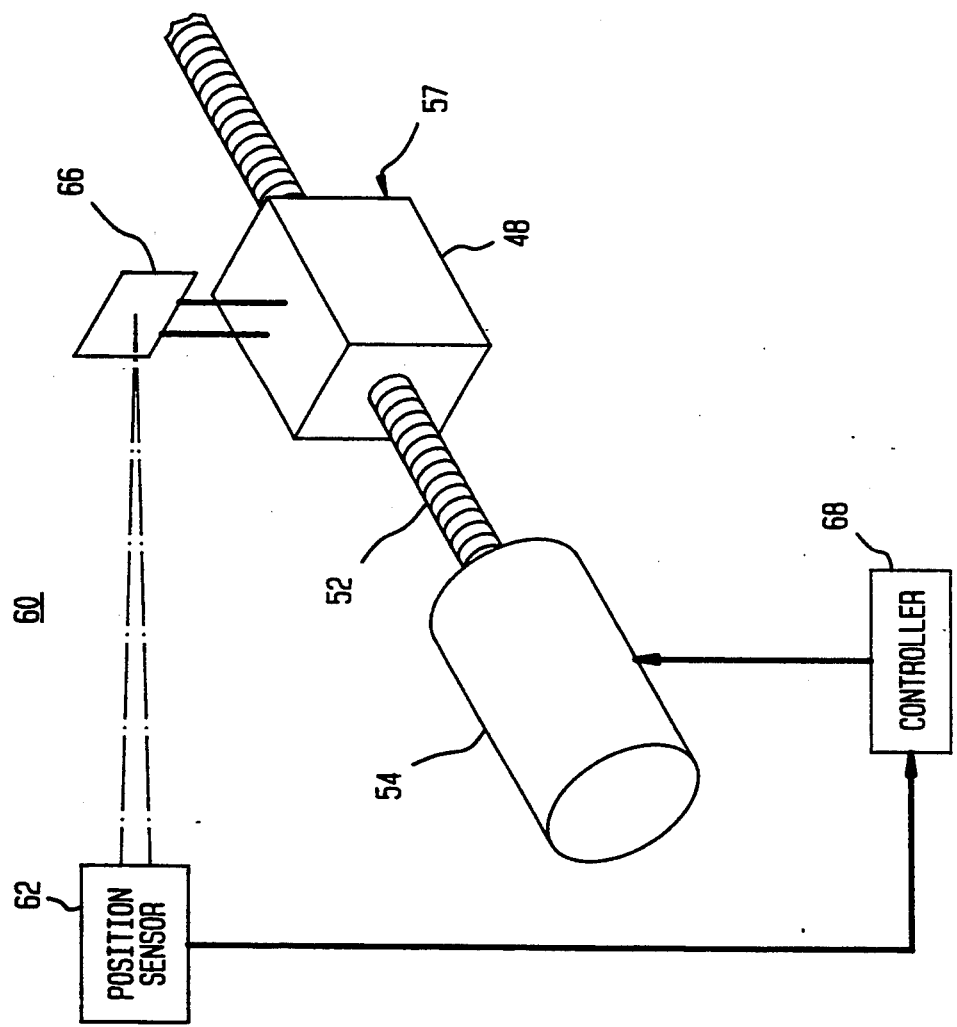
FIG. 2 is a schematic illustration of a characterization apparatus that is useful to produce a portion of the printing apparatus of FIG. 1.

Referring now to FIG. 2, there is shown in schematic form an apparatus 60 that is useful to compensate for the effects of cyclical displacement variations in one of the stage assemblies 57 of FIG. 1. The apparatus 60 comprises a position sensor 62, a mirror 66, and a microprocessor based controller 68. One of the stage assemblies 57 of FIG. 1 is shown in position on the apparatus 60. The controller 68 is coupled at an output thereof to the stepper motor 54 and at an input thereof to the position sensor 62. The position sensor 62 is a conventional laser interferometer distance sensor which is coupled optically to the mirror 66. The mirror 66 is rigidly attached to the stage 48 during operation of the apparatus 60.

In operation, the apparatus 60 is used to characterize each one of the stage assemblies 57 before it is assembled into its respective printer 40. The stepper motor 54 is driven through a series of rotational positions by the controller 68 which includes a microstepping driver circuit. At each of these rotational positions, the position sensor 62 determines a displacement of the stage 48 by sensing a change in distance between the mirror 66 and the position sensor 62. This displacement information is provided to the controller 68.

The controller 68 generates information on a conventional EPROM (Electronically Programmable Read Only Memory) that forms a look-up table relating rotational position of the lead screw 52 with displacement of the stage 48 for the particular one of the stage assemblies 57 being characterized. When the stage assembly 57 is assembled into its respective printer 40, the associated EPROM is also assembled into the printer controller 56 of the printer 40.

The printer controller 56 uses the look-up table of the EPROM to drive the stepper motor 54 so that the stage 48 is moved with uniform speed or with uniformly spaced incremental printing steps.

In order for the above described system to be useful, it is necessary that each of the stage assemblies 57 has a reference position or a "home" position from which displacements of the stage 48 are measured. A preferred embodiment of a system for generating a home position of the stage assembly is shown in FIG. 3.

Figure 3:
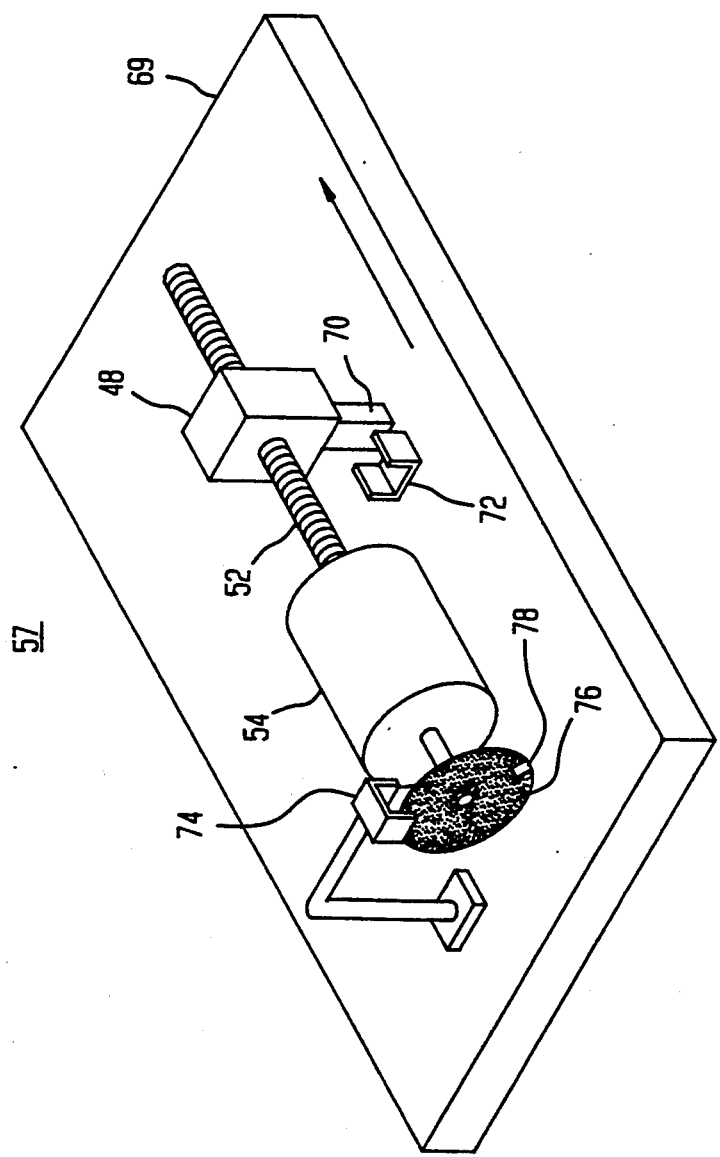
FIG. 3 is schematic illustration of a stage assembly of the printing apparatus of FIG. 1.

Referring now to FIG. 3, there is shown one of the stage assemblies 57 of FIG. 1. In particular, there is shown a base 69 (not shown in FIG. 1), the lead screw 52, the stepper motor 54, and certain elements of the stage assembly (not shown in FIG. 1) which are used to generate a home position. These elements comprise a projecting tab or flag 70, first and second conventional optical sensors 72 and 74, respectively, and a slotted wheel 76 with a slot 78 defined therein. The flag 70 is rigidly attached to the stage 48. The slotted wheel 76 is coupled to a shaft of the stepper motor 54 and its rotation corresponds to the rotation of the lead screw 52. The optical sensors 72 and 74 are mounted rigidly on the base 69 of the stage assembly 57.

The optical sensors 72 and 74 are coupled to the controller 68 when the stage assembly 57 is in the apparatus 60 of FIG. 2. The optical sensors 72 and 74 are coupled to the printer controller 56 when the stage assembly 57 is in the printer 40 of FIG. 1.

In operation, the optical sensor 72 detects a presence or absence of the flag 70 within its field of operation. The optical sensor 72 is positioned so that the flag 70 is detected when the stage is at a particular identified revolution of the lead screw 52. The optical sensor 74 detects a presence or absence of the slot 78 in the slotted wheel 76 within its field of operation. The optical sensor 74 is positioned so that the slot is detected when the lead screw 52 is at a particular angular position of one of its revolutions.

When the optical sensors 72 and 74 both sense the presence of the flag 70 and the slot 78, respectively, the controller 68 or the printer controller 56 is provided with signals to identify that position of the lead screw 52 as home.

When the lead screw 52 is being driven to home position, the following sequence is used. The stepper motor 54 is driven in a backward direction until the home position is reached. Driving of the lead screw 52 in a backward direction is continued even further until the home position has been passed. Then the direction of the stepper motor 54 is reversed to drive the lead screw 52 and the stage 48 in a forward direction until the home position is again reached. When the stage assembly is in the apparatus 60, all measurements of displacement of the mirror 66 occur after the stage has been moved in a forward direction to the home position. When the stage assembly 57 is in the printer 40, all stage driving information for printing is sent to the stepper motor 54 after the stage 48 has been moved in a forward direction to the home position. This assures that any backlash that may be in the stage assembly 57 does not produce image distortions.

Figure 4:
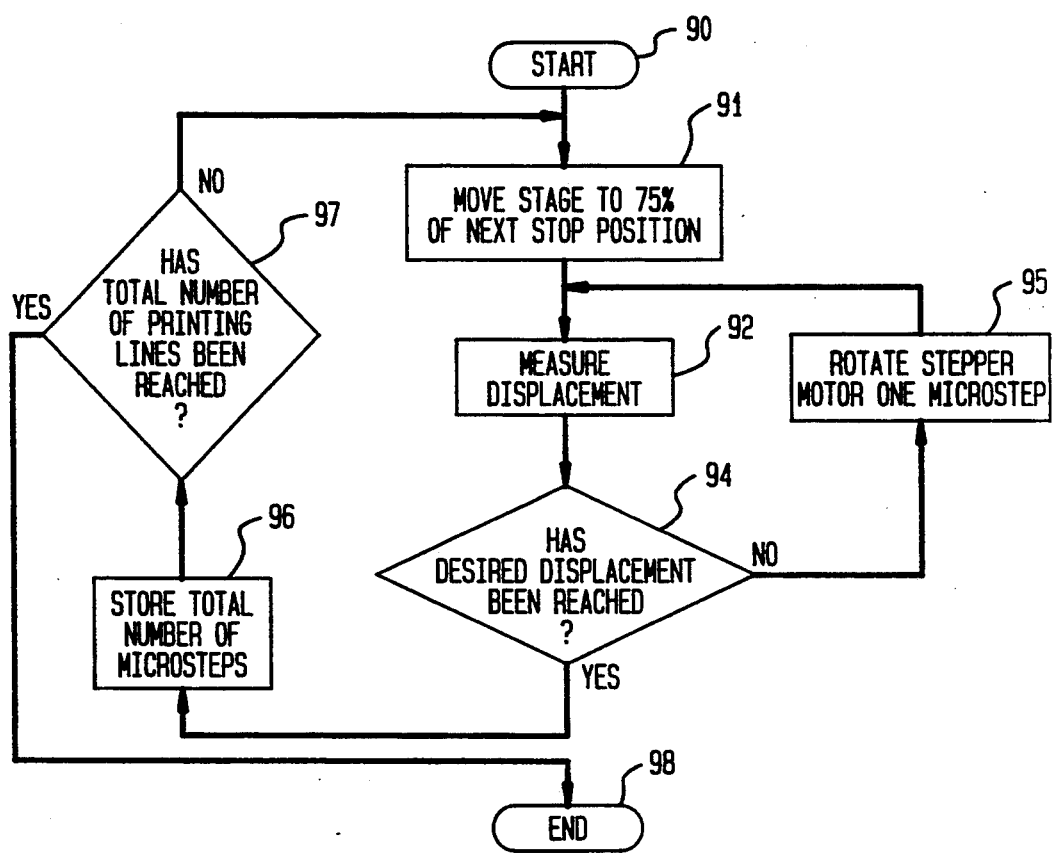
FIG. 4 is a flow chart that shows a method for producing a portion of the printing apparatus of FIG. 1.

Referring now to FIG. 4, there is shown a flow chart which shows how the controller 68 of FIG. 2 controls the operation of the apparatus 60 of FIG. 2 in one mode of operation. FIG. 4 shows a variable sequence of steps, beginning with a start 90 and ending with an end 98. Intermediate steps include steps 91, 92, 94, 95, 96, and 97. A process starts at step 90 when the stage 48 of FIG. 1 is at the home position after having been driven in a forward direction as discussed above. The process continues to step 91 in which the stepper motor 54 of FIG. 1 is driven through a series of microsteps that corresponds approximately to a displacement of the stage 48 which is about 75% of a width of one line of printing. The stepper motor 54 is stopped and a measurement of actual displacement of the stage 48 is performed in step 92. The measurement of displacement is compared to a defined width of the printing line in step 94.

If the defined width has not been reached in step 94, the process continues to step 95. In step 95, the stepper motor 54 is driven one additional microstep and the process continues to step 92. The process continues to cycle through steps 92, 94 and 95 until a desired displacement is reached. In other words, the stepper motor 54 is repeatedly driven at one microstep increments until a measurement discloses that the stage 48 has reached a displacement that corresponds to the defined width of one of the printing lines.

When the desired displacement is reached in step 94, the process continues to step 96. In step 96, a total number of microsteps needed to reach the desired displacement is stored in the EPROM in the controller 68 of the apparatus of FIG. 2.

The process then continues to step 97 in which a determination is made as to whether a total number of printing lines has been reached. If the total number of printing lines has not been reached, the process cycles back through steps 91, 92, 94, 95, 96 and 97. When a desired total is reached in step 97, the process goes to its end 98.

At the completion of this process, the EPROM contains information that reflects the number of microsteps which must be taken by the stepper motor 54 in order to reach any of the printing lines from the home position.

Figure 5:
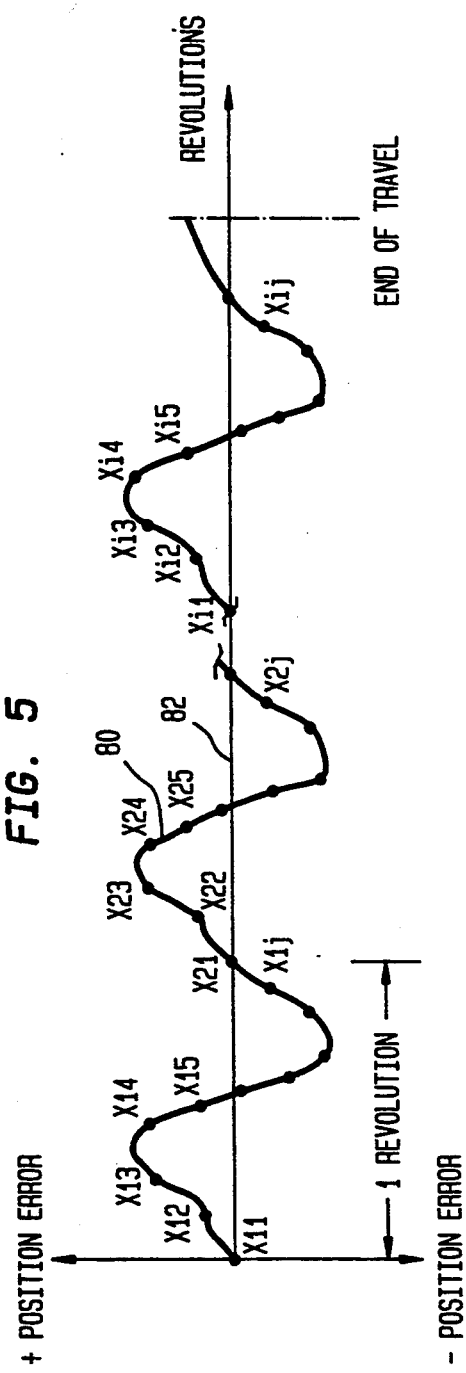
FIG. 5 is a graphical representation of position error relative to rotational position of a lead screw in the stage assembly of FIG. 3.

Referring now to FIG. 5, there is shown a graph that illustrates another mode of operation of the apparatus 60 of FIG. 2. A line 80 represents a position error of the stage 48 of FIG. 1 relative to rotational position of the lead screw 52 of FIG. 1. Position error of the stage 48 is shown on a vertical axis and rotational position of the lead screw 52 is shown on the horizontal axis in revolutions. A nominal or desired displacement of the stage 48 is shown as a straight line 82.

In this mode of operation, the apparatus 60 of FIG. 2 acts to produce an average waveform that is representative of a cyclical error in one of the stage assemblies 57. The apparatus 60 makes ten measurements of position error for each revolution of the lead screw 52. Each of these measurements is made at equal rotational spacings. FIG. 5 shows each of these measurement points with a dot on the line 80. A typical dot is denoted Xij, where i is the number of a particular revolution of the lead screw 52 and j is the number of a particular one of the ten measurements within a revolution. Thus, in a first revolution, a series of measurement points is denoted X11, X12, X13, X14 and so on. In a second revolution, a series of measurement points is denoted X21, X22, X23, X24 and so on.

Figure 6:
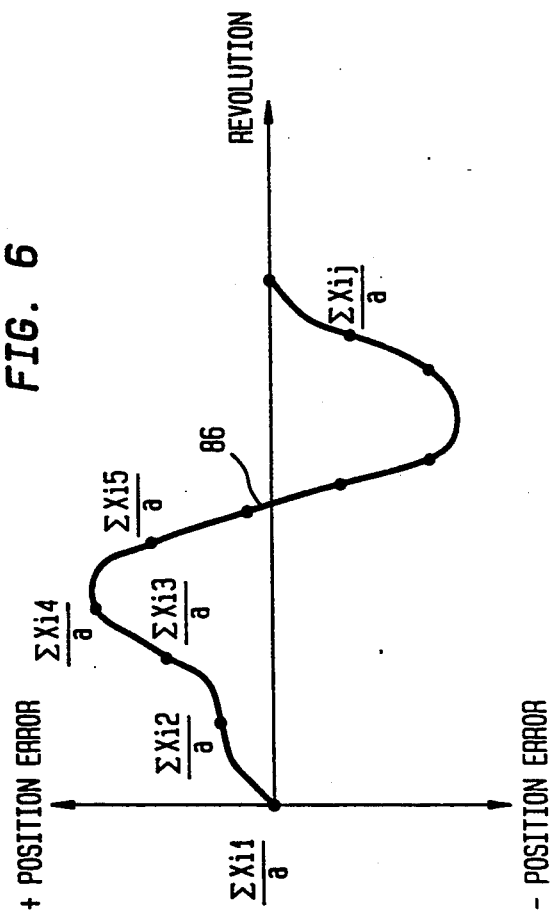
FIG. 6 is a graphical representation of a waveform that is representative of an averaging of waveforms that are shown in FIG. 5.

Referring now to FIG. 6, there is shown a graph of an average waveform 86 that is generated by the controller 68 of the apparatus 60 of FIG. 2. The waveform 86 represents an average amount of positional error of the stage 48 for any portion of one hypothetical revolution of the lead screw 52. The waveform 86 is representative of the average of all the revolutions of the lead screw 52. The controller 68 generates the waveform 86 by performing conventional summing and dividing operations. Various points along the waveform 86 are denoted generally as $\Sigma(Xij/a)$, where Xij is the identity of a point from FIG. 5 and a is a total number of revolutions of the lead screw 52 needed to complete a full displacement of the stage 48. Thus various points on the waveform 86 are denoted $\Sigma Xi1/a$, $\Sigma Xi2/a$, $\Sigma Xi3/a$ and so on.

The controller 68 of the apparatus 60 of FIG. 2 generates an EPROM that incorporates data for the average waveform 86. When the EPROM is put into the printer controller 56 of the printer 40 of FIG. 1., the printer controller 56 is made capable of driving the stepper motor 54 in a manner that is complementary to the waveform 86. When the stepper motor 54 is driven in this manner in the printer 40, the stage 48 moves with a highly uniform displacement from one printing line to the next.

Figure 7:
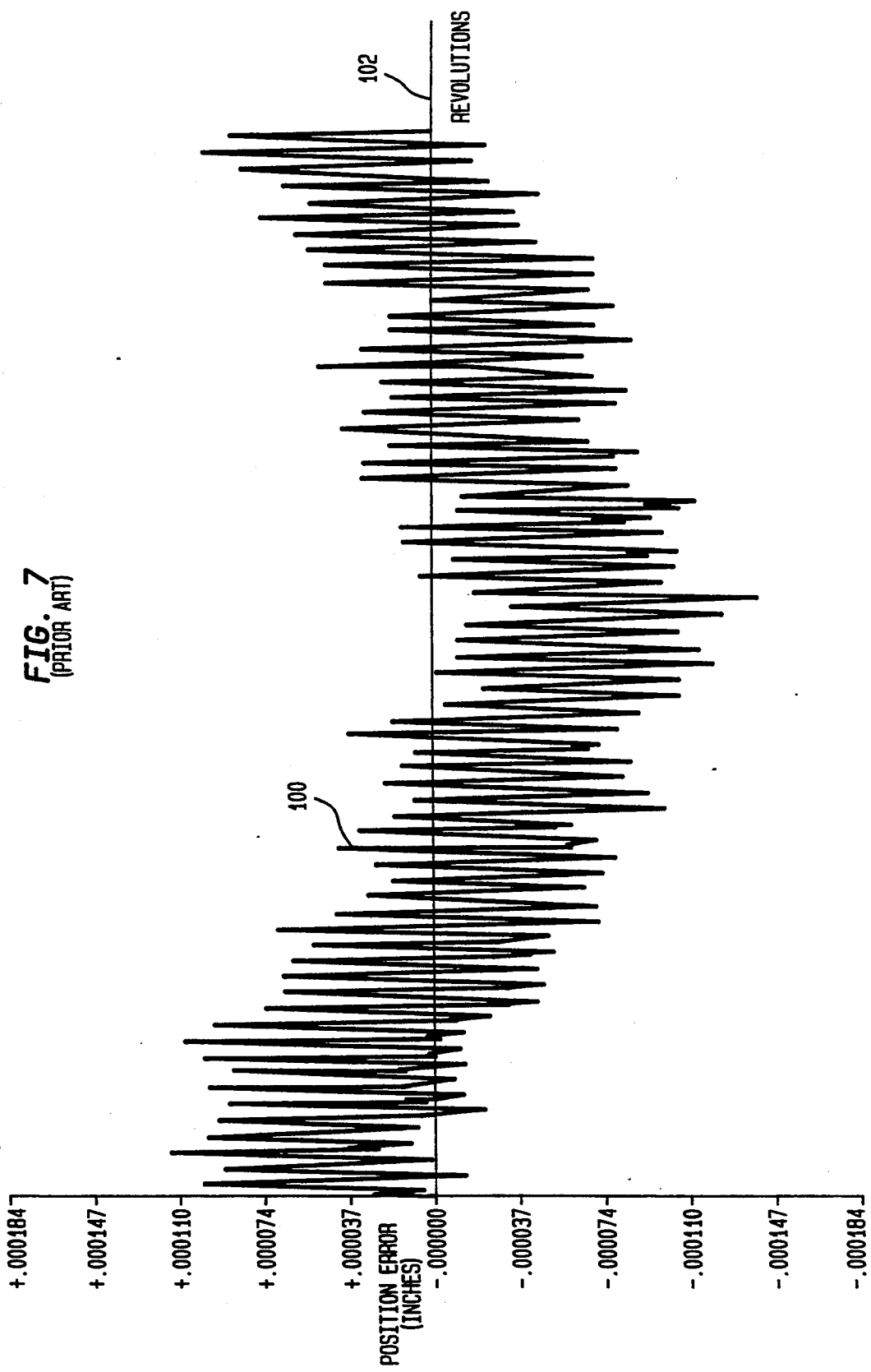
FIG. 7 is a graphical representation of position error of the stage assembly of FIG. 3 when it is operated in accordance with the prior art.

Referring now to FIG. 7, there is shown a graph having a line 100 which shows actual measurements of positional error of one of the stages 48 of FIG. 1 as a function of rotation (shown as revolutions on a horizontal axis) of one of the lead screws 52 of FIG. 1. In this context, FIG. 7 is representative of the prior art. Positional error is shown on a vertical axis in inches. A horizontal line 102 shows a zero-error, nominal displacement for the stage 48.

Figure 8:
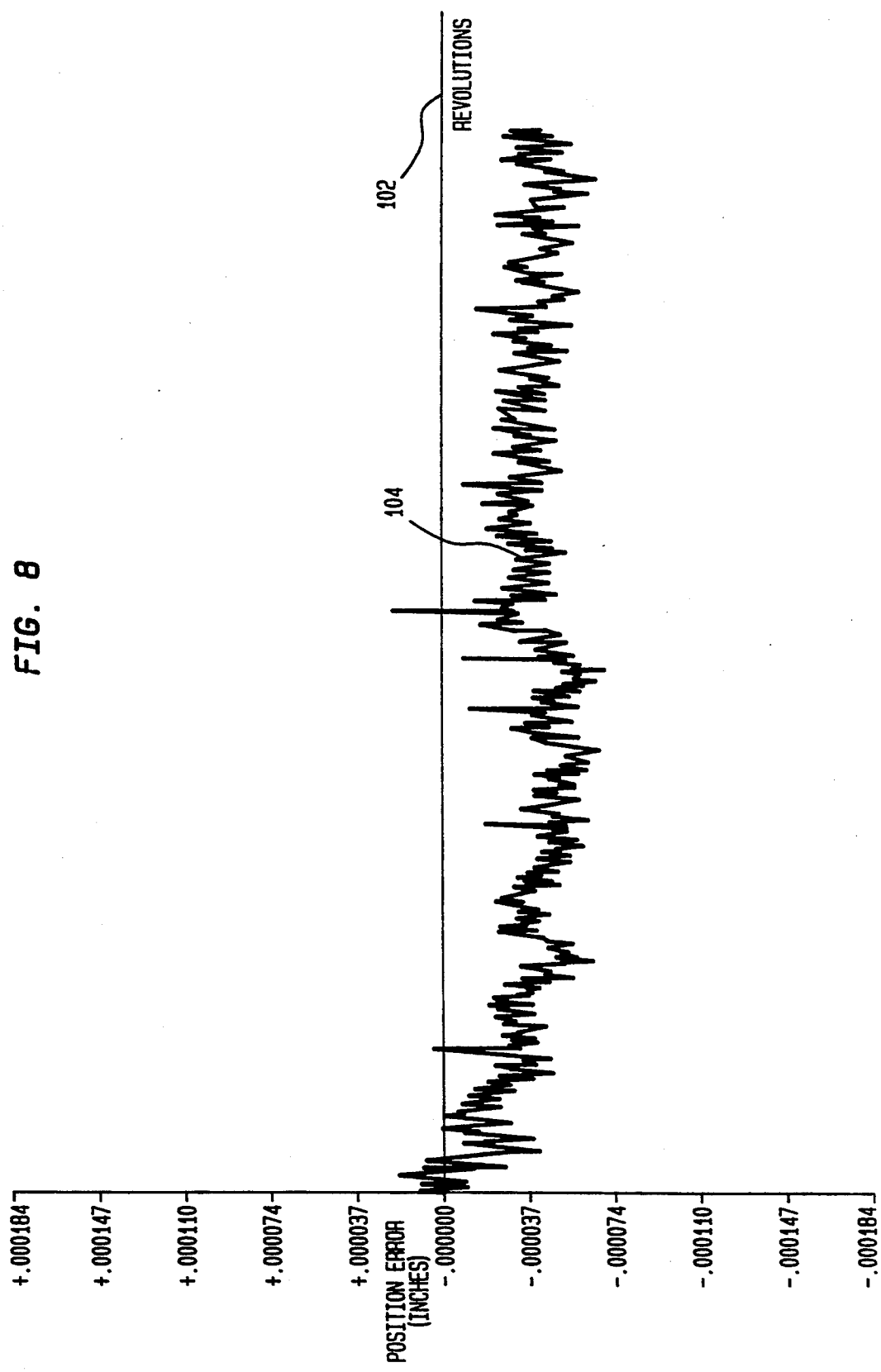
FIG. 8 is a graphical representation of position error of the stage assembly of FIG. 3 when it is operated in accordance with the present invention.

Referring now to FIG. 8, there is shown a graph having a line 104 which shows actual measurements of positional error of the same stage 48 of FIG. 1 as that represented in FIG. 7. In this context, FIG. 8 is in accordance with the present invention. A horizontal line 102 shows the same nominal displacement of the stage 48 as in FIG. 7. The measurements for FIG. 8 were taken as the lead screw 52 was being driven through one of the printer controllers 56 that was equipped with an EPROM generated by the apparatus 60 of FIG. 2. In other words, the stage 48 was driven in a manner that compensates for cyclic error in the lead screw 52. The magnitude of positional error of the stage 48 is reduced substantially. Reduction in magnitude of positional error of the stage 48 results in a corresponding reduction in magnitude of distortions in a printed image made by the printer 40.

It is desirable to completely eliminate positional error. However, it can be seen that while the magnitude of positional error is reduced, it is nevertheless detectable with measurement instruments. As explained hereinbelow, even though there remains a minor amount of positional error, a frequency of occurrence of the error is made higher by the application of the inventive compensating technique. Shifting of positional error to a higher frequency results in the error being virtually invisible to an unaided human eye when the error manifests itself on a printed image.

Figure 9:
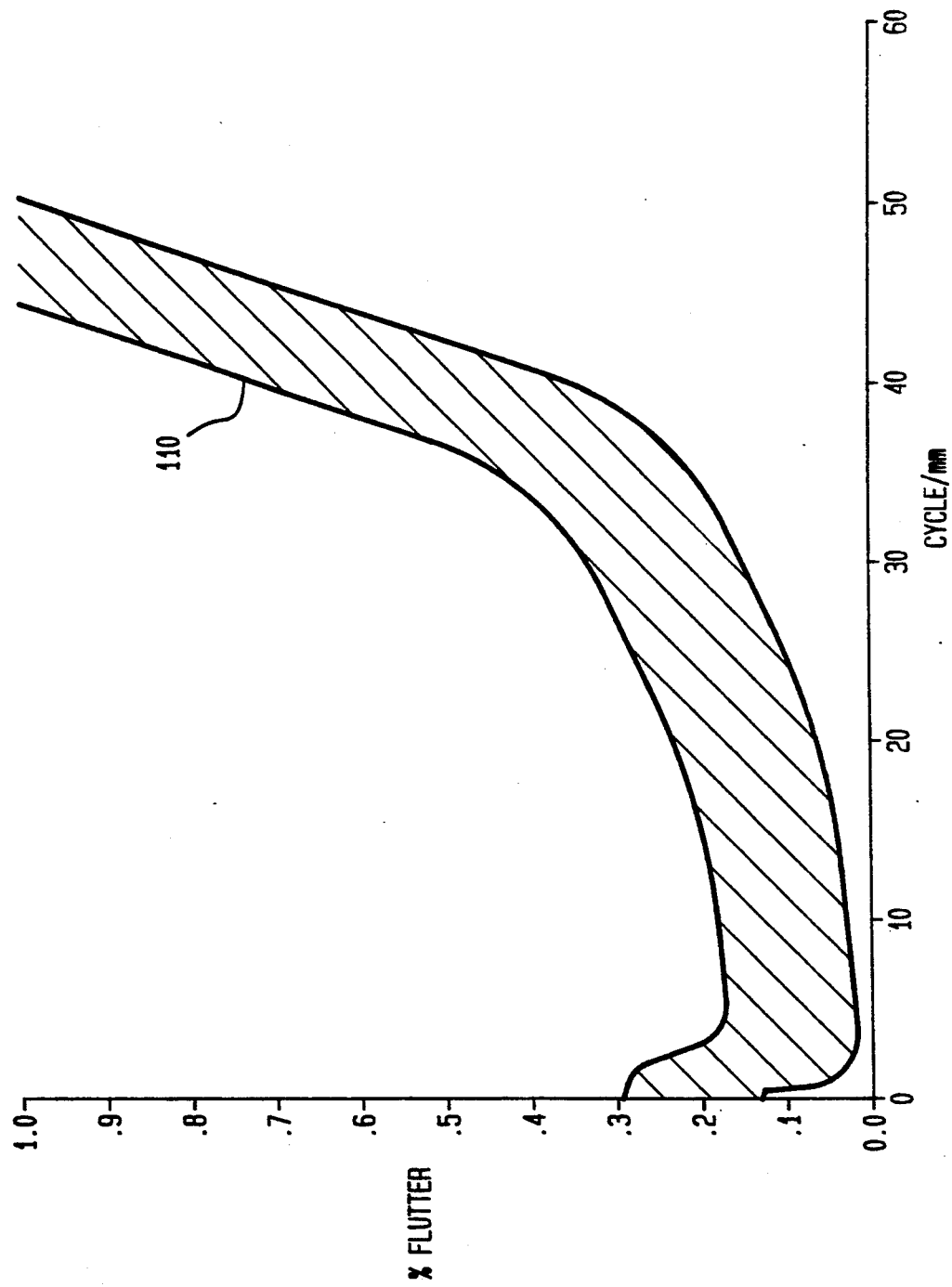
FIG. 9 is a graphical representation of relative sensitivity of a human eye to various cyclical anomalies in an image.

Referring now to FIG. 9, there is shown a graph having a band 110 that represents a range of thresholds of responsiveness of typical unaided human eyes to cyclical anomalies (flutter) in an image. On the vertical axis of the graph there is shown increasing percentages of flutter. On the horizontal axis of the graph there is shown a rate or frequency of occurrence of the flutter in cycles/mm. A bottom edge of the band 110 shows that a highly sensitive human eye detects any flutter with a magnitude greater than about 0.03% when the flutter occurs at a frequency of 5 cycles/mm. When flutter occurs at a frequency of about 40 cycles/mm., the magnitude of the flutter must be about 0.25% before it is detectable by a highly sensitive human eye. A top edge of the band 110 shows that a less sensitive human eye detects flutter at a magnitude of 0.2% or greater at a frequency of 5 cycles/mm. rate. It can be seen that all human eyes are particularly sensitive to flutter when it occurs at a frequency of about 5 cycles/mm.

Figure 10:
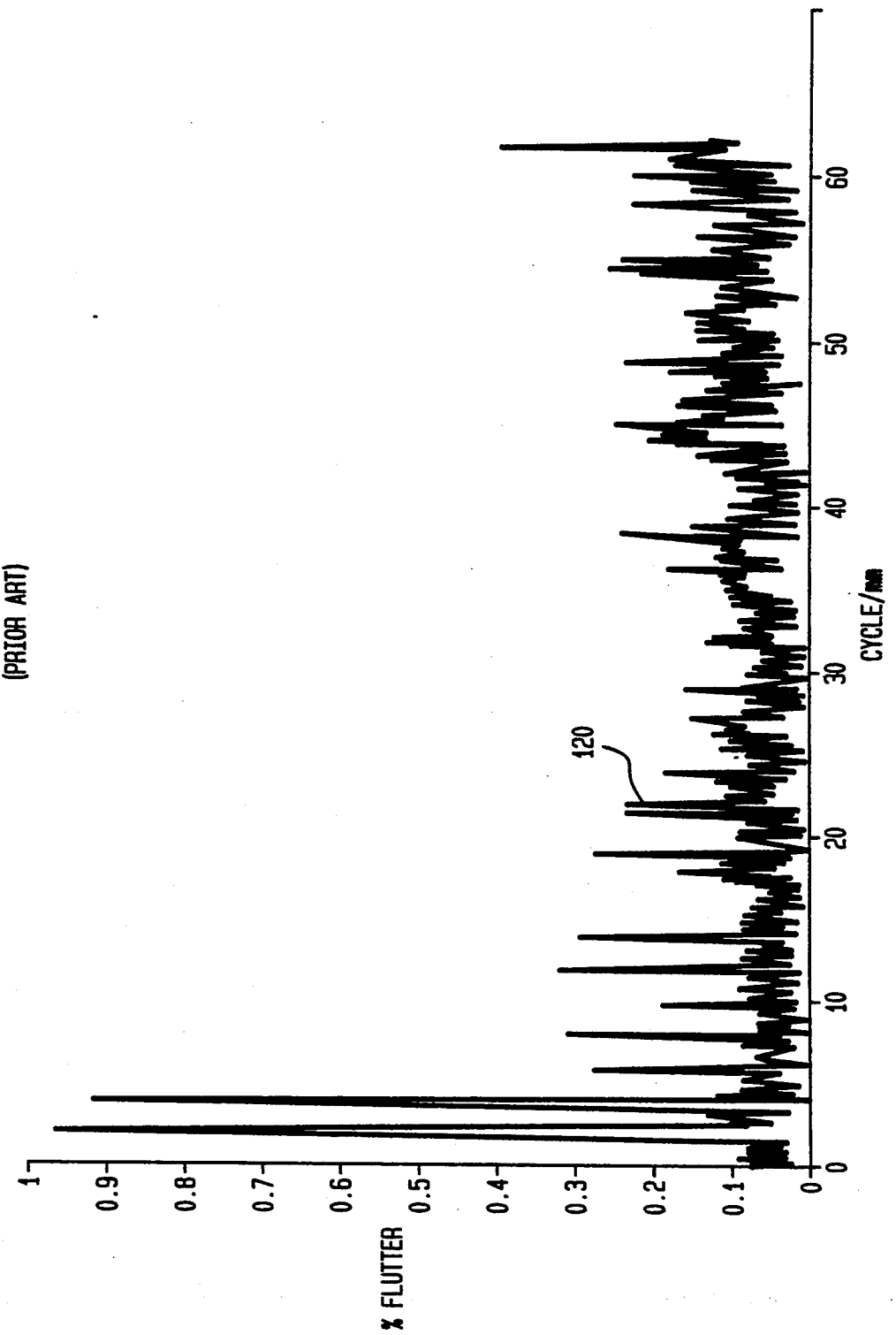
FIG. 10 is a graphical representation of a spectral distribution of the position error shown in FIG. 7.

Referring now to FIG. 10, there is shown a graph having a spectrum line 120 that represents a spectral analysis (Fourier Transformation) of the line 100 of FIG. 7. In other words, the line 100 shows a magnitude and frequency of flutter in an image which is produced by the positional errors of the stage 48 of FIG. 1. The line 120 illustrates that the positional errors of the stage 48 (which were measured in making the line 100) produce large magnitude flutter at a frequency of about 5 cycles/mm. This is particularly objectionable because flutter at this frequency is highly visible, as illustrated in FIG. 9. In this context, FIG. 10 is representative of the prior art.

Figure 11:
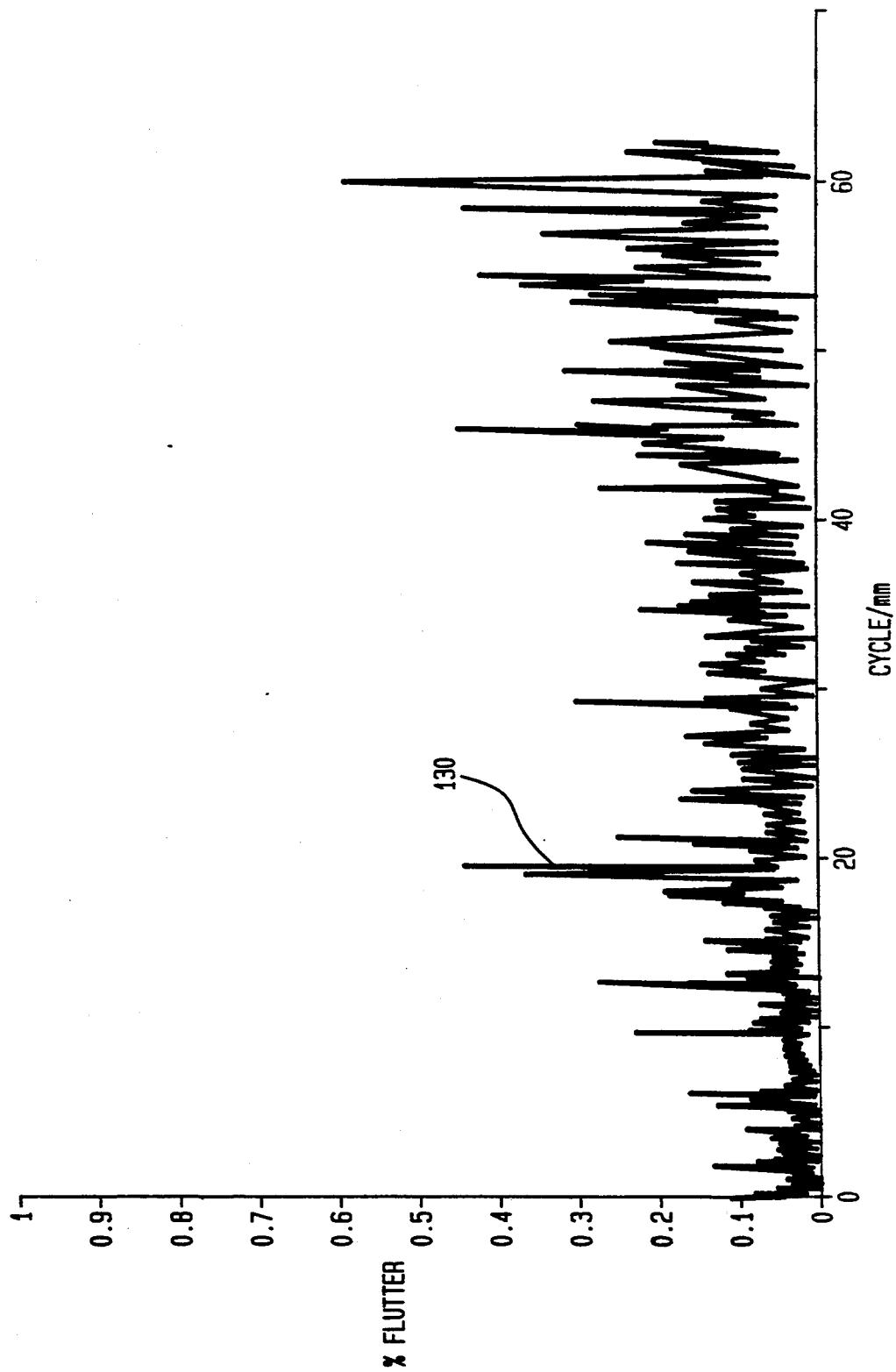
FIG. 11 is a graphical representation of a spectral distribution of the position error shown in FIG. 8.

Referring now to FIG. 11, there is shown a graph having a spectrum line 130 that represents a spectral analysis (Fourier Transformation) of the line 104 of FIG. 8. The line 130 illustrates the positional errors of the stage 48 which was measured in making the line 104 (i.e., after compensation of the stage assembly 57). It can be seen that the magnitude of flutter in the critical frequency range of about 5 cycles/mm is below the vision threshold level for a typical human eye. Some high magnitude flutter still remains at high frequencies, but at these high frequencies the magnitude of the flutter is below the visible threshold.

Thus, it can be seen the technique described herein provides a method by which the printer 40 can produce high resolution images with substantially invisible distortions, while utilizing an inexpensive lead screw. It has been found that the present invention has substantial utility in printers with printing line spacings of about 2000 lines per inch or smaller and which have lead screws with a pitch of about 0.050 inches per revolution or smaller.

It is to appreciated and understood that the specific embodiments of the invention are merely illustrative of the general principles of the invention. Various modifications may be made by those skilled in the art which are consistent with the principles set forth. For example, the stage assembly is useful not only in printers, but in any application in which uniformity of motion is desired.

What is claimed is:

1. Apparatus for moving an object with a substantially uniform motion with a lead screw, said apparatus comprising:
   the lead screw having, for each revolution thereof, a predetermined pattern of relationships between the rotation thereof and the linear movement of said object which would result in a non-uniform linear movement of said object if the lead screw were rotated uniformly;
   a stepper motor arranged to drive said lead screw with steps which produce a fraction of a revolution of the lead screw; and
   means for driving the stepper motor with an information signal that generates a pattern of steps of the stepper motor that vary as a function of said relationships to produce substantially uniform linear motion of said object during each revolution of the lead screw.

2. Apparatus for moving an object according to claim 1 wherein said information signal generates a pattern of steps of the stepper motor that vary inversely of said relationships.

3. Apparatus for moving an object according to claim 1 including means for determining said pattern of relationships between the rotation of said lead screw and the linear movement of said object, means for storing said pattern of relationships in a memory, and means for deriving said information signal from said memory.

4. Apparatus for moving an object according to claim 1 including means for determining said information signal for a first revolution of said lead screw for use in each subsequent revolution.

5. Apparatus for moving an object according to claim 3 including means for determining said information signal for a first revolution of said lead screw for use in each subsequent revolution.

6. Apparatus for moving an object according to claim 1 including the step of printing an image on said object.

7. A method of moving an object with a substantially uniform motion with a lead screw, the lead screw having, for each revolution thereof, a predetermined pattern of relationships between the rotation thereof and the linear movement of said object which would result in a non-uniform linear movement of said object if the lead screw were rotated uniformly, and a stepper motor arranged to drive said lead screw with steps which produce a fraction of a revolution of the lead screw; and the method comprising the step of driving the stepper motor with an information signal that generates a pattern of steps of the stepper motor that vary as a function of said relationships to produce substantially uniform linear motion of said object during each revolution of the lead screw.

8. The method of moving an object according to claim 7 wherein said information signal generates a pattern of steps of the stepper motor that vary inversely of said relationships.

9. The method of moving an object according to claim 7 including means of determining said pattern of relationships between the rotation of said lead screw and the linear movement of said object, storing said pattern of relationships in a memory, and deriving said information signal from said memory.

10. The method of moving an object according to claim 7 wherein said information signal is determined for a first revolution of said lead screw for use in each subsequent revolution.

11. The method of moving an object according to claim 9 wherein said information signal is determined for a first revolution of said lead screw for use in each subsequent revolution.

12. The method of moving an object according to claim 7 including the step of printing an image on said object.

13. The apparatus for printing of claim 6 wherein:
the image is produced as a series of successive lines of printing; and
the object is held stationary during a printing of each of the lines.

14. The apparatus for printing of claim 13 wherein:
the lead screw has a pitch of about 0.050 inches per revolution or smaller; and
the printing is performed at a pitch of about 2000 lines per inch or smaller.

15. The apparatus for printing of claim 13 wherein the stepper motor produces a unique number of steps for each line of printing.

16. The apparatus for printing of claim 13 further comprising:
means for producing a unique pattern of steps for a first revolution of the lead screw; and
means for driving the stepper motor so that each subsequent revolution of the lead screw is driven with the same pattern of steps.

17. The apparatus for printing of claim 6 wherein:
the image is produced as a series of successive lines of printing;
the object is moved continuously during a printing of each the lines.

18. The apparatus for printing of claim 17 wherein the stepper motor produces a unique number of steps for each line of printing.

19. The apparatus for printing of claim 17 further comprising:
means for producing a unique pattern of steps for a first revolution of the lead screw; and
means for driving the stepper motor so that each subsequent revolution of the lead screw is driven with the same pattern of steps.

20. The method of printing of claim 6 wherein:
the image is produced as a series of successive lines of printing; and
the object is held stationary during a printing of each or the lines.

21. The method of printing of claim 20 wherein:
the lead screw has a pitch of about 0.050 inches per revolution or smaller; and
the printing is performed at a pitch of about 2000 lines per inch or smaller.

22. The method of printing of claim 20 wherein the stepper motor produces a unique number of steps for each line of printing.

23. The method of printing of claim 20 which additionally comprises:
producing a unique pattern of steps for a first revolution of the lead screw; and
driving the stepper motor so that each subsequent revolution of the lead screw is driven with the same pattern of steps.

24. The method of printing of claim 6 wherein: .
the image is produced as a series of successive lines of printing; and
the object is moved continuously during a printing of each the lines.

25. The method of printing of claim 24 wherein the stepper motor produces a unique number of steps for each line of printing.

26. The method of printing of claim 24 which additionally comprises:
producing a unique pattern of steps for a first revolution of the lead screw; and
driving the stepper motor so that each subsequent revolution of the lead screw is driven with the same pattern of steps.

* * * * *